(12) United States Patent
Walker et al.

(10) Patent No.: US 9,393,658 B2
(45) Date of Patent: Jul. 19, 2016

(54) PORTABLE POWER TOOL (75) Inventors: Andrew Walker, Durham (GB);
Frederick R. Bean, Finksburg, MD (US); John S. Vantran, Parkton, MD (US)

(73) Assignee: BLACK & DECKER INC., New Britain, CT (US)

( * ) Notice: Subject to any disclaimer, the term of this patent is extended or adjusted under 35 U.S.C. 154(b) by 946 days.

(21) Appl. No.: 13/523,036

(22) Filed: Jun. 14, 2012

(65) Prior Publication Data
US 2013/0337728 A1 Dec. 19, 2013

(51) Int. Cl.
*B24B 55/06* (2006.01)
*B24B 55/10* (2006.01)
*B24B 23/04* (2006.01)
*B23Q 11/00* (2006.01)

(52) U.S. Cl.
CPC ........ *B23Q 11/0071* (2013.01); *B23Q 11/0046* (2013.01); *B24B 23/04* (2013.01); *B24B 55/06* (2013.01); *B24B 55/105* (2013.01); *Y02P 70/171* (2015.11)

(58) Field of Classification Search
CPC ........ B24B 55/02; B24B 55/06; B24B 55/10; B24B 55/105; B24B 55/055; B24B 23/04; B23Q 11/0046; B23Q 11/0071
USPC .................. 451/344, 356, 357, 451, 453, 456
See application file for complete search history.

(56) References Cited

U.S. PATENT DOCUMENTS

| 182,141 A | 9/1876 | Wilson |
| 1,983,277 A * | 12/1934 | Emmons .................... 451/359 |
| 2,218,035 A * | 10/1940 | Benson ..................... 15/332 |
| 2,439,596 A | 4/1948 | Crosby |
| 2,900,678 A | 8/1959 | Curtis |
| 2,967,314 A | 1/1961 | Kowalewski |
| 3,186,022 A | 6/1965 | Forslund |
| 3,273,327 A | 9/1966 | Hoffman |
| 3,535,829 A | 10/1970 | Dudek |
| 3,824,745 A | 7/1974 | Hutchins |
| 4,047,913 A | 9/1977 | Okumura |
| 4,321,071 A | 3/1982 | Sobole |
| 4,360,990 A | 11/1982 | Hubbard et al. |
| 4,381,628 A | 5/1983 | Dicke |
| 4,624,078 A | 11/1986 | VanRijen et al. |
| 4,631,077 A | 12/1986 | Spicer et al. |
| 4,640,698 A | 2/1987 | Ohishi et al. |

(Continued)

FOREIGN PATENT DOCUMENTS

| DE | 19827173 | 12/1999 |
| DE | 10328002 | 1/2005 |

(Continued)

*Primary Examiner* — Eileen Morgan
(74) *Attorney, Agent, or Firm* — Stephen R. Valancius (57) ABSTRACT

A portable power tool includes a motor located in a motor housing of the tool and having a rotary output shaft, a working part arranged to be driven by the rotary output shaft, a dust collection container arranged to collect dust produced by the operation of the power tool on a workpiece during use, and a fan. The fan is arranged to be rotated about an axis by the motor to convey the dust to the dust collection container, the axis of rotation of the fan being non-coaxial with the rotary output shaft of the motor. A part of an exterior surface of the dust collection container is formed as a recess into which the motor housing at least partly extends, such that the dust collection container extends at least partly around the motor housing.

20 Claims, 7 Drawing Sheets

(56) References Cited

U.S. PATENT DOCUMENTS

| | | | |
|---|---|---|---|
| 4,765,099 A | 8/1988 | Tanner | |
| 4,967,516 A | 11/1990 | Hoshino et al. | |
| 4,973,092 A | 11/1990 | Godbe et al. | |
| 5,022,900 A | 6/1991 | Bar-Yona et al. | |
| 5,042,855 A | 8/1991 | Bennett et al. | |
| 5,074,044 A | 12/1991 | Duncan et al. | |
| 5,105,585 A | 4/1992 | Hampl et al. | |
| 5,131,192 A | 7/1992 | Cheng | |
| D333,891 S | 3/1993 | Reed et al. | |
| 5,199,229 A | 4/1993 | Herold et al. | |
| 5,319,888 A | 6/1994 | Huber et al. | |
| 5,411,386 A | 5/1995 | Huber et al. | |
| 5,419,737 A * | 5/1995 | Brazell et al. | 451/453 |
| 5,423,893 A | 6/1995 | Kotaki | |
| 5,538,040 A | 7/1996 | Huber et al. | |
| 5,560,120 A | 10/1996 | Swanson et al. | |
| 5,626,510 A | 5/1997 | Bergner et al. | |
| 5,651,188 A | 7/1997 | Swanson et al. | |
| 5,664,339 A | 9/1997 | Swanson et al. | |
| 5,679,122 A | 10/1997 | Moll et al. | |
| D386,241 S | 11/1997 | Nurse | |
| 5,709,595 A | 1/1998 | Bergner et al. | |
| 5,893,939 A | 4/1999 | Rakocy et al. | |
| 5,947,804 A * | 9/1999 | Fukinuki et al. | 451/357 |
| 5,967,886 A | 10/1999 | Wuensch et al. | |
| 6,091,498 A | 7/2000 | Hanson et al. | |
| 6,106,034 A | 8/2000 | Allen | |
| 6,168,695 B1 | 1/2001 | Woodruff et al. | |
| 6,264,752 B1 | 7/2001 | Curtis et al. | |
| 6,318,951 B1 | 11/2001 | Schmidt et al. | |
| 6,331,197 B1 | 12/2001 | Herding et al. | |
| 6,342,137 B1 | 1/2002 | Woodruff et al. | |
| 6,350,319 B1 | 2/2002 | Curtis et al. | |
| 6,413,436 B1 | 7/2002 | Aegerter et al. | |
| 6,473,915 B1 | 11/2002 | Davis | |
| 6,514,131 B1 | 2/2003 | Reich et al. | |
| 6,609,338 B2 | 8/2003 | Hightower | |
| 6,654,122 B1 | 11/2003 | Hanson et al. | |
| 6,660,137 B2 | 12/2003 | Wilson et al. | |
| 6,672,820 B1 | 1/2004 | Hanson et al. | |
| 6,672,948 B2 | 1/2004 | Mizuno | |
| 6,827,640 B2 | 12/2004 | Bures et al. | |
| 6,874,825 B1 | 4/2005 | Rauner | |
| 6,921,467 B2 | 7/2005 | Hanson et al. | |
| 6,923,841 B2 | 8/2005 | Chen | |
| 6,974,369 B2 | 12/2005 | Mizun | |
| 7,182,150 B2 | 2/2007 | Grossman | |
| 7,282,074 B1 | 10/2007 | Witter | |
| 7,323,023 B2 | 1/2008 | Michele et al. | |
| 7,338,348 B2 | 3/2008 | Melvin et al. | |
| 7,354,226 B2 | 4/2008 | Britz | |
| 7,497,886 B2 * | 3/2009 | Walker | 55/385.1 |
| 7,611,556 B2 * | 11/2009 | Borinato | 55/385.1 |
| 7,799,104 B2 | 9/2010 | Valentini | |
| 7,819,725 B2 * | 10/2010 | Hagiwara et al. | 451/356 |
| 7,976,364 B2 | 7/2011 | Roehm | |
| 2006/0037855 A1 | 2/2006 | Hanson et al. | |
| 2008/0045123 A1 | 2/2008 | Hanks et al. | |
| 2009/0158608 A1 | 6/2009 | Schaub et al. | |
| 2009/0280728 A1 | 11/2009 | Roehm et al. | |
| 2010/0048101 A1 | 2/2010 | King et al. | |
| 2010/0154369 A1 | 6/2010 | Berisha et al. | |
| 2010/0170538 A1 | 7/2010 | Baker et al. | |

FOREIGN PATENT DOCUMENTS

| | | |
|---|---|---|
| EP | 0713421 | 5/1996 |
| EP | 1661661 | 5/2006 |
| EP | 1679156 | 7/2006 |
| EP | 1955630 | 8/2008 |
| EP | 2106327 | 10/2009 |
| EP | 2113336 | 11/2009 |
| EP | 2315643 | 5/2011 |
| GB | 2340056 | 2/2000 |
| GB | 2433711 | 7/2007 |
| JO | 2007061977 | 3/2007 |
| JP | 57018451 | 1/1982 |
| JP | 2000006054 | 1/2000 |
| WO | WO2007093123 | 8/2007 |

* cited by examiner

PORTABLE POWER TOOL

BACKGROUND OF THE INVENTION

The present invention relates to portable power tools, and especially to portable sanders, but it also relates to portable power tools in general.

European Patent Application EP 2113336 A1 discloses a power tool having a dust collection chamber of substantially circular cross-section. An inlet to the dust collection chamber is at the perimeter of the circle, and an outlet of the chamber is drawn from within the circle. A fan, which is operable to transport air from a working element of the power tool to the inlet of the dust collection chamber, is mounted on a shaft which is rotated by a drive belt. The drive belt is driven by a motor of the power tool.

U.S. Pat. No. 5,419,737 discloses a palm grip random orbital sanding machine having a sanding platen. A fan adjacent to the sanding platen in an exhaust chamber produces an air flow from the vicinity of the platen out through exhaust ports of the exhaust chamber. A housing of the sanding machine has a pair of longitudinal slots provided on opposite sides of the housing which removably receive the legs or side members of a U-shaped debris container. Each side member of the debris container has an entrance port coincident with a respective exhaust port of the exhaust chamber, and means for filtering the debris from the air flow.

SUMMARY OF THE INVENTION

The present invention seeks to provide a portable power tool with a dust collection container, which collects the dust efficiently and in a compact arrangement.

A first aspect of the invention provides a portable power tool, comprising: a motor located in a motor housing of the tool and having a rotary output shaft; a working part arranged to be driven by the rotary output shaft; a dust collection container arranged to collect dust produced by the operation of the power tool on a workpiece during use; and a fan arranged to be rotated about an axis by the motor to convey the dust to the dust collection container, the axis of rotation of the fan being non-coaxial with the rotary output shaft of the motor; wherein a part of an exterior surface of the dust collection container is formed as a recess into which the motor housing at least partly extends, such that the dust collection container extends at least partly around the motor housing.

Preferably, the recessed part of the dust collection container comprises an exterior wall of the dust collection container. The part of the motor housing that extends into the recess of the dust collection container preferably mates with the dust collection container. For example, the recess of the container and the part of the motor housing may have correspondingly shaped surfaces which fit together. Advantageously, at least a portion of the recessed part of the dust collection container may be concave, and preferably at least part of the motor housing is correspondingly convex.

In some embodiments of the invention, at least a portion of the motor housing that extends into the recess also functions as an exterior wall of the dust collection container in use.

In preferred embodiments of the invention, the power tool further comprises at least one dust conveyance conduit extending between the dust collection container and a location adjacent to the working part, the dust conveyance conduit arranged to convey dust impelled by the fan from the working part to the dust collection container. Preferably, the dust conveyance conduit extends at least partly around the motor. The dust conveyance conduit may extend at least partly around the motor housing or may be part of the motor housing, for example. Advantageously, the dust conveyance conduit may include two or more branches, preferably each branch extending at least partly around the motor. For example, the dust conveyance conduit may include two branches which connect with the dust collection container substantially on opposite sides of the motor.

Preferably, the power tool further comprises a main housing of which the motor housing forms a part. The motor housing may be connected to the main housing, or the motor housing may constitute a portion of one or more mouldings that form the main housing. For example, the main housing may be formed in two parts (e.g. halves) that are joined together, and the motor housing may be formed from a portion of each part of the main housing.

Advantageously, the main housing may include first and second spaced apart retaining parts (interconnected by the motor housing, for example), and the dust collection container preferably is arranged to be retained at least partly between the first and second spaced apart retaining parts. The first retaining part may house the fan, and preferably includes air inlets and air outlets, to allow the airflow created by the fan to enter the first retaining part from the dust collection container and to be expelled by the fan into the atmosphere. Preferably, the first retaining part is located further from the working part than is the second retaining part. The second retaining part preferably is located adjacent to the working part.

The dust collection container of the power tool preferably is arranged to be retained at least partly within a cavity provided by the main housing, for example between the first and second retaining parts (if present) of the main housing, preferably in a front region of the main housing. The power tool may include a handle extending from a rear side of the power tool, and the dust collection container preferably is located on an opposite front side of the power tool, e.g. around the front side of the power tool.

Accordingly, a second aspect of the invention provides a portable power tool, comprising: a motor located in a motor housing of the tool and having a rotary output shaft; a working part arranged to be driven by the rotary output shaft; a dust collection container arranged to collect dust produced by the operation of the power tool on a workpiece during use; a handle extending from a rear side of the power tool; and a fan arranged to be rotated about an axis by the motor to convey the dust to the dust collection container, the axis of rotation of the fan being non-coaxial with the rotary output shaft of the motor; wherein the dust collection container is located at least partly at a front side of the power tool, opposite to the rear side. Preferably, the dust collection container extends at least partly around the motor housing.

The dust collection container preferably is removable from the power tool, e.g. to empty the container of dust collected during use of the power tool. The dust collection container preferably is removably attached (or attachable) to the motor housing and/or the main housing and/or the dust conveyance conduit(s), for example by means of interconnecting (e.g. latching) parts of the dust collection container and the housing(s) or conduit(s). Preferably, the main housing or the dust collection container includes a latch which is arranged to engage with, and disengage from a surface (e.g. provided by a groove or other recess) provided on the dust collection container or on the main housing (respectively), to removably retain the dust collection container on the main housing. More preferably, the combination of the rotatable latch and the surface includes a cam arrangement to urge the dust collection container into a substantially airtight connection with the dust conveyance conduit(s). The latch preferably is a rotatable latch, more preferably having an axis of rotation that is substantially parallel to a main longitudinal (front-back) axis of the power tool.

Accordingly, a third aspect of the invention provides a portable power tool, comprising: a motor located in a housing of the tool and having a rotary output shaft; a working part arranged to be driven by the rotary output shaft; a dust collection container arranged to collect dust produced by the operation of the power tool on a workpiece during use; a fan arranged to be rotated about an axis by the motor to convey the dust to the dust collection container, the axis of rotation of the fan being non-coaxial with the rotary output shaft of the motor; and a latch provided on the housing or on the dust collection container which is arranged to engage with, and disengage from, a surface provided respectively on the dust collection container or on the housing, to removably retain the dust collection container on the housing. Preferably, the latch is arranged to urge the dust collection container into a substantially airtight connection with a dust conveyance conduit of the power tool, the dust conveyance conduit arranged to convey dust impelled by the fan from the working part to the dust collection container. The latch preferably is a rotatable latch, more preferably having an axis of rotation that is substantially parallel to a main longitudinal axis of the power tool.

The dust collection container preferably includes one or more air inlets and one or more air outlets. Dust-laden air impelled by the fan preferably is arranged to enter the dust collection container via the one or more air inlets, and substantially dust-free air preferably is arranged to exit the dust collection container via the one or more air outlets. The dust collection container preferably includes at least one filter arranged to retain the dust within the dust collection container as the air impelled by the fan passes through the dust collection container. In preferred embodiments of the invention the, or each, filter is removable from the duct collection container, e.g. for cleaning. Additionally or alternatively, one or more air outlets of the dust collection container may comprise or include a filter. Additionally or alternatively, the dust collection container may be arranged to retain the dust in the dust collection container without the use of a filter, for example by cyclonic air flow. In some embodiments of the invention, the dust collection container may include one or more filters and may also be arranged to provide cyclonic air flow.

The rotary output shaft of the motor preferably carries a belt drive wheel which is arranged to move a drive belt which extends around the belt drive wheel. The drive belt preferably is arranged to rotate a belt driven wheel carried on a rotational shaft which is non-coaxial with the rotary output shaft of the motor. The fan preferably is mounted on the rotational shaft and is arranged to rotate therewith, driven by the belt. Preferably, the belt drive wheel has a larger radius than the radius of the belt driven wheel, so that the fan rotates at a higher speed than does the motor. This has the advantage that the fan can create a greater airflow than if it were mounted on, and rotated at the same rate as, the rotary output shaft of the motor. Preferably, the axis of rotation of the fan is substantially parallel to the axis of the rotary output shaft of the motor. Advantageously, the axis of rotation of the fan may be located forward of the rotary output shaft of the motor.

Advantageously, the fan may be located downstream, with respect to an airflow created by the fan, of the dust collection container. That is, the fan preferably is a "clean" fan, which is not located in the path of the dust produced by the power tool during use. Preferably, the fan is located on an opposite side of the dust collection container to the working part, the fan preferably being adjacent (e.g. immediately adjacent) to the dust collection container. Alternatively, the fan may be located on an opposite side of the motor to the dust collection container; for example, the dust collection container may extend around a front side of the power tool, and the fan may be located substantially at a rear side of the power tool (or vice versa).

In preferred embodiments of the invention, the power tool may include a second fan arranged to be rotated by the motor, the second fan being located adjacent to the working part and arranged to convey the dust away from the working part, preferably towards the dust collection container. Consequently, the second fan (if present), may be located in the path of the dust produced by the power tool during use, that is, it may be a "dirty" fan. Preferably, the second fan is located on the rotary output shaft of the motor, and rotates therewith. For embodiments of the invention including a second fan, the fan described above whose axis of rotation is non-coaxial with the rotary output shaft of the motor may be referred to as a first fan.

The power tool may, in some embodiments of the invention, include a third fan arranged to be rotated by the motor, the third fan being arranged to pass air over the motor to cool the motor. The second and/or third fans (if present) preferably are arranged to rotate around the axis of rotation of the motor.

The power tool according to the invention preferably comprises a sander, and the working part preferably comprises a platen or roller arranged to carry sand paper or another abrasive part. For example, the sander may be an orbital sander, a random orbit sander, a belt sander, a quarter sheet, third sheet or half-sheet sander, or substantially any kind of portable powered sander. Alternatively, the power tool according to the invention may be another kind of power tool, for example the power tool may be a drill, a hammer drill, a grinder, a router, a saw, or a planer. In each case, the working part of the power tool comprises a part which is driven by the motor and which is a tool, or is arranged to carry a tool (e.g. a drill bit) or other accessory, which works on a workpiece in use.

A fourth aspect of the invention provides a portable power tool, comprising: a motor located in a motor housing of the tool and having a rotary output shaft; a working part arranged to be driven by the rotary output shaft; a dust collection container arranged to collect dust produced by the operation of the power tool on a workpiece during use; and a fan arranged to be rotated about an axis by the motor to convey the dust to the dust collection container, the axis of rotation of the fan being non-coaxial with the rotary output shaft of the motor.

It is to be understood that any feature (including any preferred feature) of any aspect of the invention may be a feature (including a preferred feature) of any other aspect of the invention.

BRIEF DESCRIPTION OF THE DRAWINGS

The invention will now be described, by way of example, with reference to the accompanying drawings, of which.

DETAILED DESCRIPTION OF THE DRAWINGS

Figure 1:
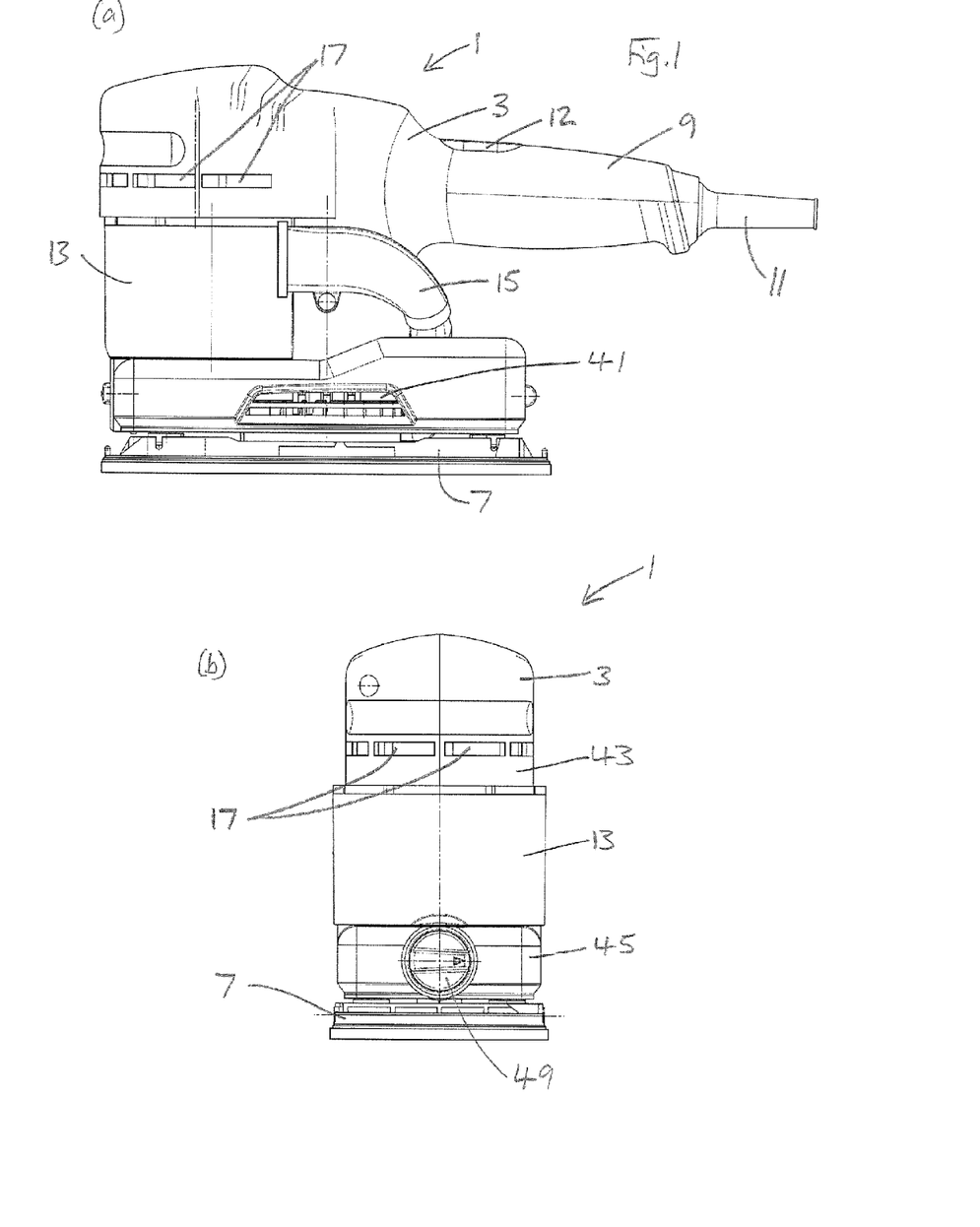
FIG. 1 (views (a) and (b)) shows a first embodiment of a portable power tool in the form of a sander, according to the invention.

FIG. 1 shows a first embodiment of a portable power tool in the form of a sander 1 (in particular, a "⅓ sheet sander") according to the invention. The sander 1 comprises a main housing 3 which houses an electric motor 5, including a stator 6, (see FIGS. 2 and 3) and other components of the power tool, described below. Below the main housing 3 is a working part 7 in the form of a sanding platen to which sand paper (or another type of abrasive part, or a polishing part) may be removably attached, in a conventional manner, e.g. by hook-and-loop connections and/or by clamping retainers (not shown). Extending from a rear part of the main housing 3 is a handle 9, and extending therefrom a power cord protector 11. The electrical power cord is not shown, but it extends from the interior of the main housing 3 and through the power cord protector 11. An electrical switch assembly 12 is contained in the handle 9. Attached to a front part of the main housing 3 is a dust collection container 13. Also shown are dust conveyance conduit branches 15 of a dust conveyance conduit 14, and air outlets 17 of the main housing 3.

Figure 2:
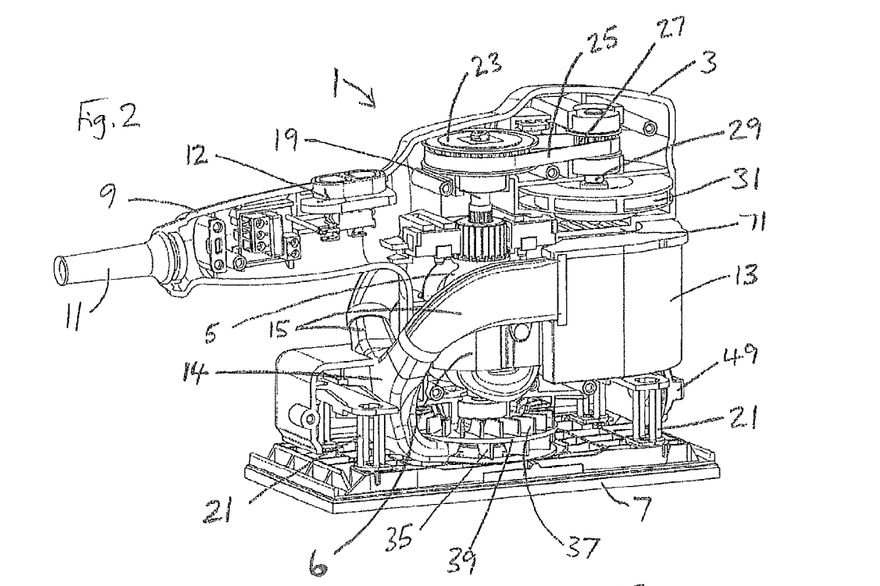
FIG. 2 shows another view of the first embodiment, with part of the main housing removed to reveal part of the interior of the power tool.
Figure 6:
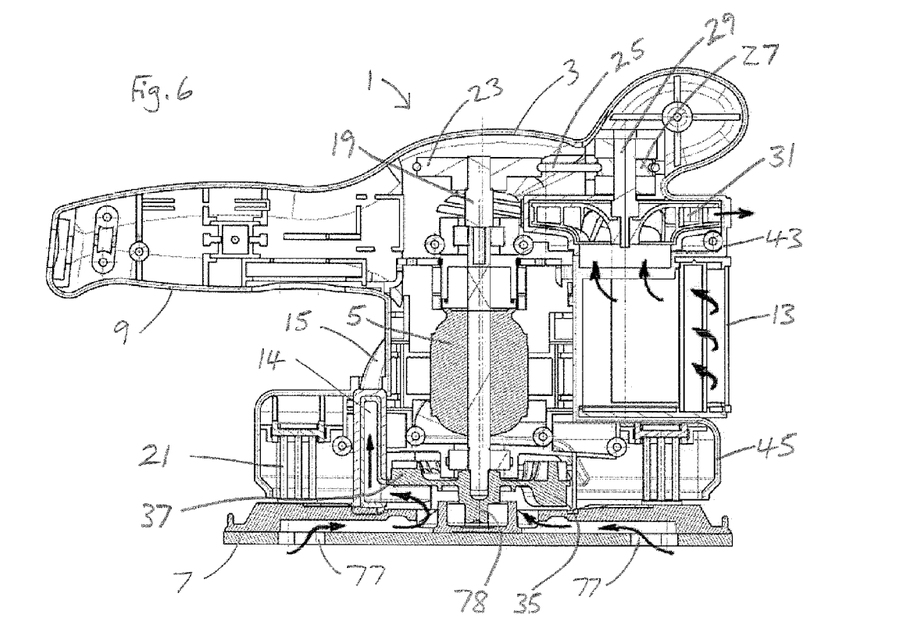
FIG. 6 shows another side view of the second embodiment of a power tool in the form of a sander, according to the invention, with part of the main housing removed to reveal the interior of the power tool.

FIG. 2 shows another view of the first embodiment of the invention, with part of the main housing 3 removed to reveal part of the interior of the sander 1. The main housing 3 contains an electric motor 5 having a rotary output shaft 19 which extends beyond both ends of the motor. The working part 7 (the sanding platen) is attached to the bottom end of the rotary output shaft 19 via an offset (eccentric) connection (not shown in FIG. 2, but the type of connection is shown in FIG. 6, as item 78). The working part 7 is also attached to the main housing 3 via four flexible struts 21 in a conventional manner so that the working part 7 performs an orbital sanding action in use.

Figure 4:
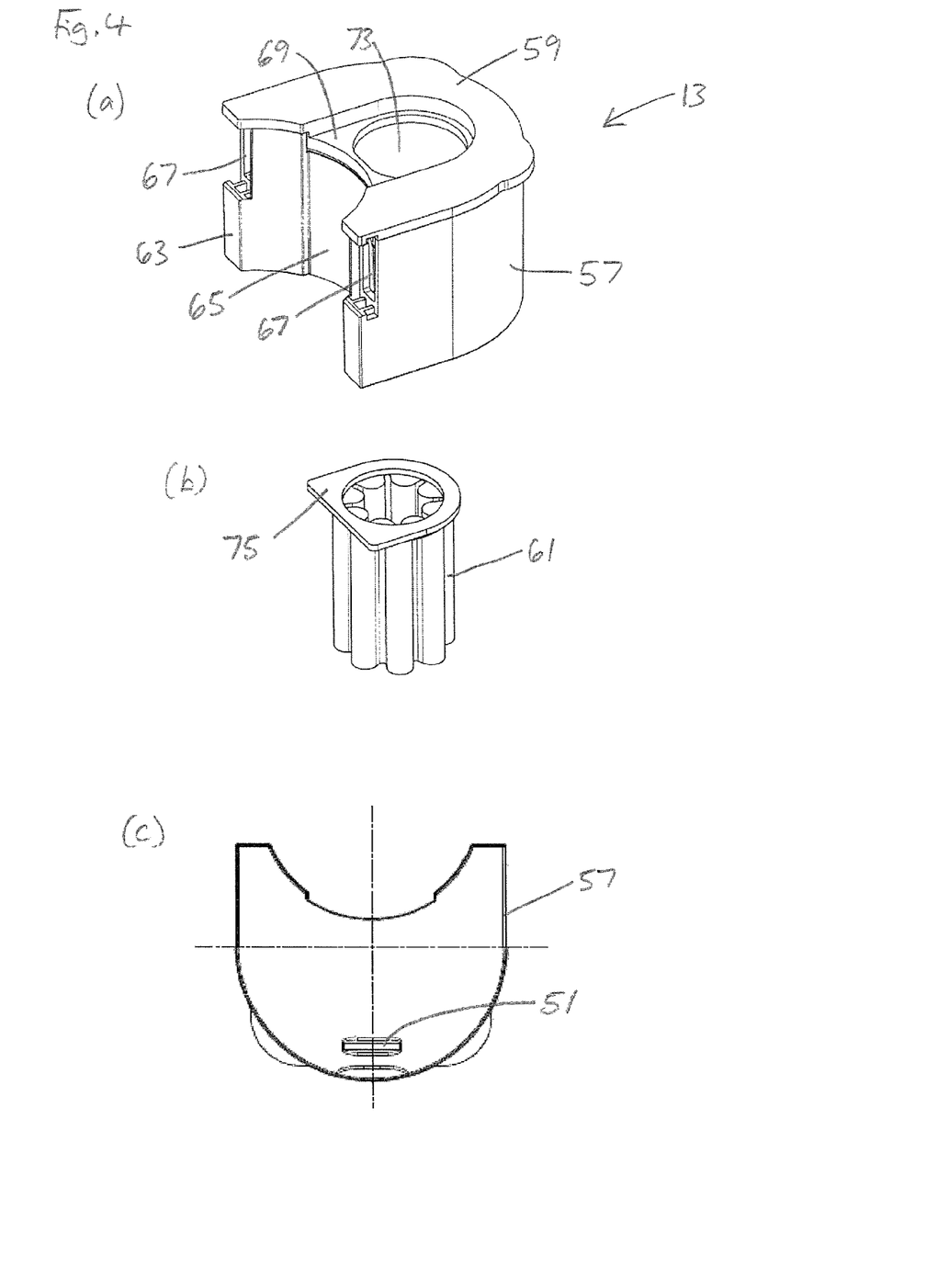
FIG. 4 shows the dust collection container of FIGS. 1 and 2; view (a) shows the container with the filter of the container removed, view (b) shows the filter, and view (c) shows the underside of the container.

The top end ("top" in the normal upright use of the power tool) of the rotary output shaft 19 carries a belt drive wheel 23 which is arranged to move a drive belt 25. The drive belt 25 is arranged to rotate a belt driven wheel 27 carried on a rotational shaft 29 which is located forward of, and parallel to, the rotary output shaft 19 of the motor, in the main housing 3. The rotational shaft 29 is therefore non-coaxial with the rotary output shaft 19 of the motor, and it is arranged to rotate a first fan 31 located on the rotational shaft. The first fan 31 is located within the main housing 3 adjacent to the dust collection container 13, on an opposite side of the dust collection container to the working part 7. The first fan 31 is arranged to help create an airflow from the working part 7 through the dust conveyance conduit 14, through the dust conduit branches 15, into the dust collection container 13, through a filter in the dust container 13, out of the dust container 13, through inlet openings 33 in the main housing 3, and expelled by the first fan 31 through the air outlets 17 into the atmosphere. (The filter is not shown in FIG. 2, but is shown in FIG. 4.) The first fan 31 is therefore located downstream, with respect to the airflow created by the fan in use, of the dust collection container 13, and it is therefore a "clean" fan because the dust is removed from the airflow and retained in the dust collection container before it reaches the fan.

FIG. 2 also shows a second fan 35 which is attached to the bottom end of the rotary output shaft 19 of the motor 5, and thus is driven by the motor. The second fan 35 is located adjacent to the working part 7 and is arranged to help convey dust away from the working part and into the dust conveyance conduit 14. The air flow from the working part, through the dust conveyance conduit 14 and its branches 15, and into and through the dust collection container 13, is therefore created by a combination of the first and second fans 31 and 35 in this embodiment of the invention.

A third fan 37 is also shown in FIG. 2. The third fan 37 is part of a single component comprising the second and third fans 35 and 37, separated from each other by a central disc 39. The third fan 37 is arranged to cause air to flow from the exterior of the main housing 3, through openings 41 in the main housing and over the motor, to prevent the motor from overheating during use. The air flow created by the third fan 37 is expelled from the main housing via outlet openings 38 (see FIG. 5).

Figure 3:
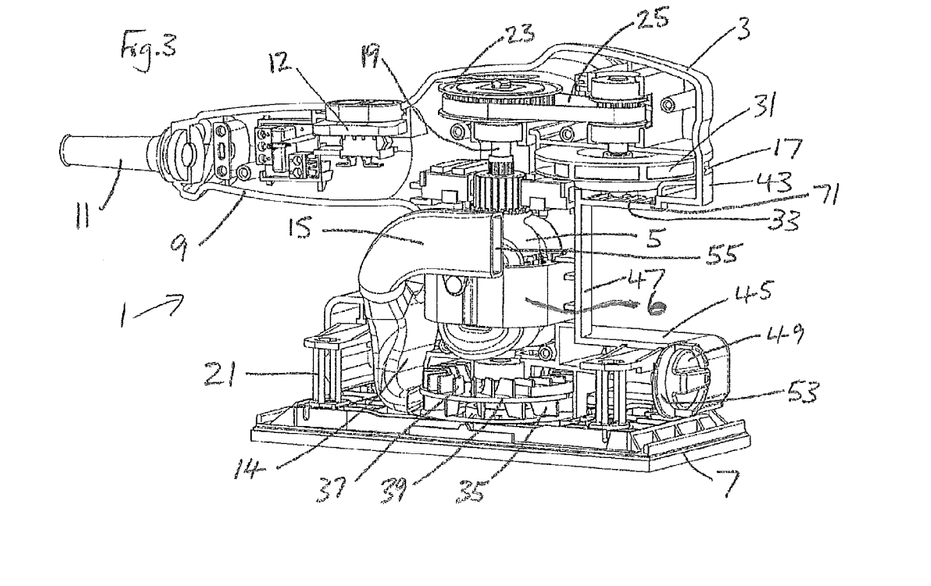
FIG. 3 shows another view of the first embodiment, but with the dust collection container removed.

FIG. 3 shows another view of the sander shown in FIG. 1, but with the dust collection container 13 removed. This view shows that the first fan 31 is housed within a first retaining part 43 of the main housing 3, and that the dust collection container is retained, in use, between the first retaining part 43 and a second retaining part 45 of the main housing, which is spaced apart from the first retaining part. FIG. 3 also shows part of the motor housing 47 which forms a part of the main housing 3 and which extends around the motor 5, and shows (in combination with FIG. 2) that the dust collection container 13 extends partly around the motor housing. The dust collection container is removably attached to the main housing 3 by means of a rotatable latch mechanism 49 located on the main housing, which releasably engages with a groove 51 (see FIG. 4(c)) provided in the underside of the dust collection container. A rim 53 of the latch mechanism 49 provides a camming engagement with the groove 51 of the dust collection container 13 to urge the dust collection container into a substantially airtight fit with the outlet opening 55 of each dust conveyance conduit branch 15. In this way, the dust collection container is releasably retained on the main housing 3 such that it extends partly around the motor housing 47 and is connected to the dust conveyance conduit branches 15.

The views of FIG. 4 show the dust collection container 13 also shown in FIGS. 1 to 3. FIG. 4(a) shows a main body 57 and cap 59 of the dust collection container, FIG. 4(b) shows a filter 61 of the container, and FIG. 4(c) is a view of the underside of the main body 57. The main body 57 of the dust collection container 13 includes an exterior wall 63 having an exterior surface formed as a concave recess 65 into which the motor housing 47 of the power tool 1 is arranged to extend, such that the dust collection container extends partly around the motor housing. The dust collection container also includes a pair of air inlets 67, each of which is arranged to communicate in a substantially airtight manner with the outlet opening 55 of a respective dust conveyance conduit branch 15. The cap 59 of the duct collection container 13 is arranged to lie in contact with a corresponding exterior surface of the first retaining part 43 of the main housing 3, including a depression 69 of the cap which is arranged to receive a projecting part 71 of the first retaining part 43, which projecting part includes the inlet openings 33 of the main housing 3. Extending through the depression 69 of the cap 59 is an opening 73 which is arranged to receive the filter 61. The filter 61 includes an upper flange part 75 which is arranged to fit in the depression 69 outside the opening 73. FIG. 4(c) shows the underside of the main body 57 of the dust collection container 13, the underside including the groove 51 into which the rim 53 of the of the latch mechanism 49 provides a camming engagement to urge the dust collection container into a substantially airtight fit with the outlet opening 55 of each dust conveyance conduit branch 15.

Figure 5:
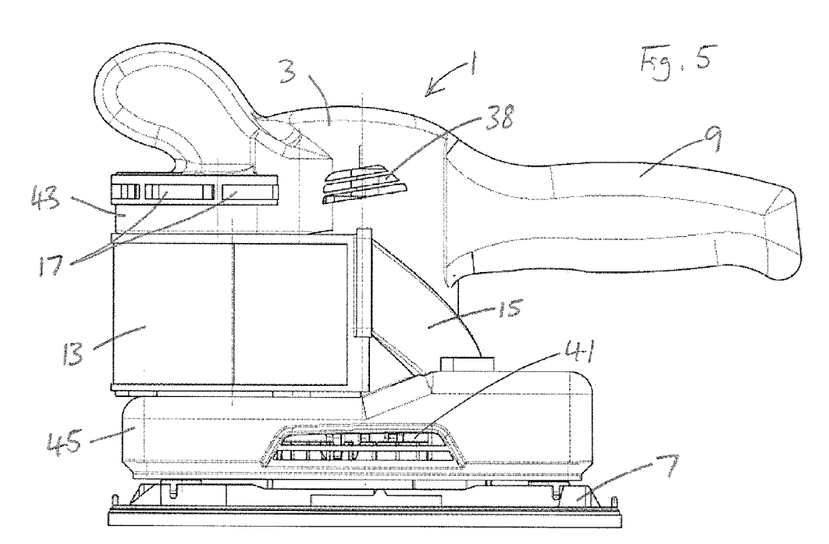
FIG. 5 shows a side view of a second embodiment of a portable power tool in the form of a sander, according to the invention.

FIGS. 5 and 6 show views of a second embodiment of a power tool according to the invention, in the form of another sander 1 (in particular, another "⅓ sheet sander"). The second embodiment is similar to the first embodiment, and like features share the same reference numerals. FIG. 6 includes arrows which represent the flow of dust-laden air through apertures 77 in the working part 7, into the dust conveyance conduit 14, through the dust conduit branches 15, and into the dust collection container 13. The dust is trapped in the dust collection container 13, and the dust-free air flows through the filter 61, out of the dust container 13, through inlet openings 33 in the main housing 3, and is expelled by the first fan 31 through the air outlets 17 into the atmosphere.

Figure 7:
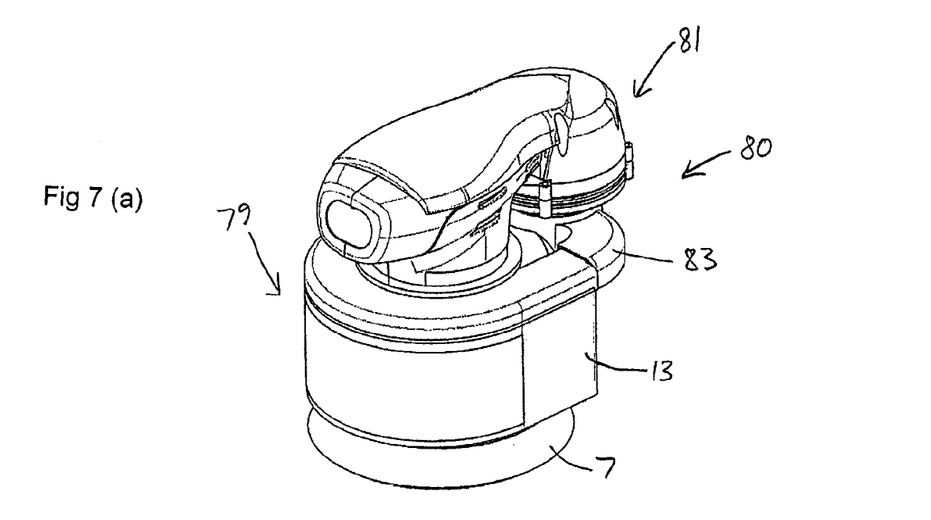
FIG. 7 (views (a) to (d)) shows a third embodiment of a portable power tool in the form of a sander, according to the invention.
Figure 8:
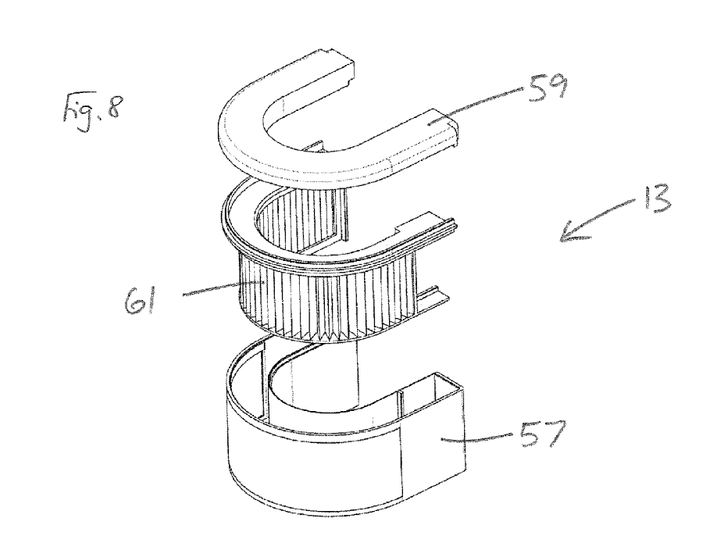
FIG. 8 is an exploded drawing of the dust collection container of the third embodiment of the invention.
Figure 9:
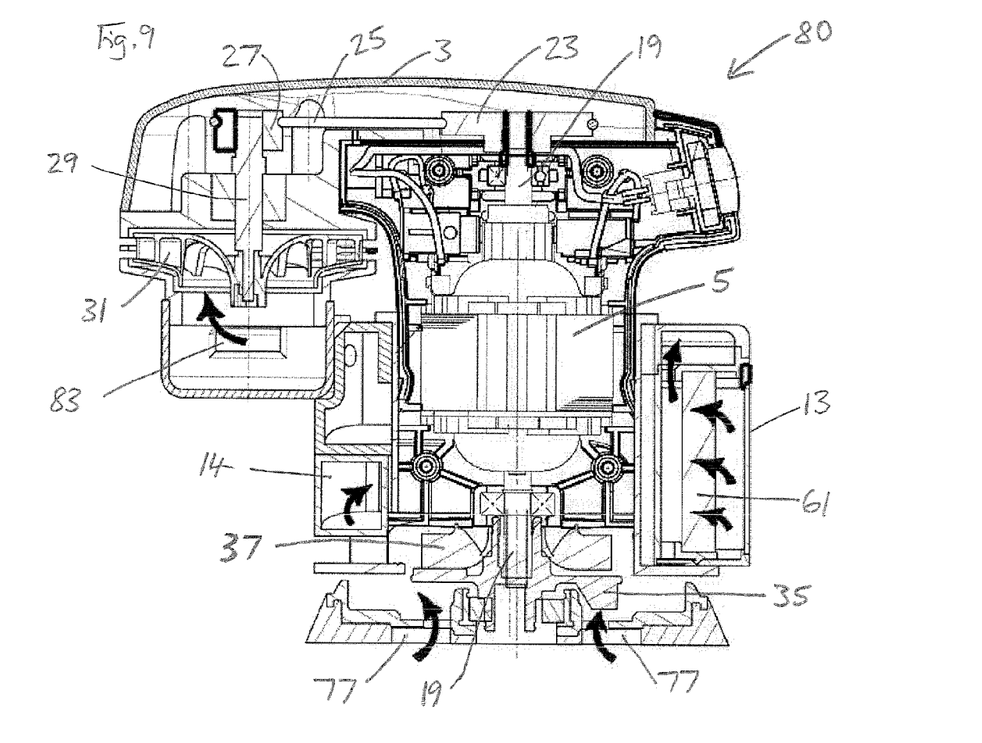
FIG. 9 shows a side view of the third embodiment of the invention, with part of the main housing removed to reveal the interior of the power tool.

FIGS. 7 to 9 show various views of a third embodiment of the invention, comprising a portable power tool in the form of a random orbit sander 80. Again, features corresponding to those of FIGS. 1 to 6 have the same reference numerals. One of the main differences between the third embodiment of the invention on the one hand, and the first and second embodiments on the other hand, is that in the third embodiment the first fan 31 is not located adjacent to the dust collection container 13, but is instead located on an opposite side the motor 5 to much of the dust collection container. Consequently, the rotational shaft 29 which is parallel to the rotary output shaft 19 of the motor and which carries the belt driven wheel 27 and the first fan 31, is located behind the rotary output shaft 19 of the motor 5. FIG. 7(b) shows the sander 80 with a top portion 85 of the main housing 3 removed to show the arrangement of the belt drive wheel 23, the belt 25, the belt driven wheel 27 and the rotational shaft 29. Thus, although the dust collection container 13 extends mainly around a front side 79 of the power tool, the first fan 31 is located substantially at a rear side 81 of the power tool.

A consequence of this arrangement is that a pair of symmetrical air flow conduits 83 is provided between the dust collection container 13 and the first fan 31, to bridge the greater distance between the two in this embodiment compared to the first two embodiments. Each air flow conduit 83 has an air inlet opening 87 which is arranged to communicate in a substantially airtight manner with a corresponding respective air outlet opening 89 of the dust collection container 13.

Another feature of the random orbit sander 80 is that its dust conveyance conduit 14 does not branch into two branches 15, but instead is a single unitary conduit which extends partly around the motor, and is part of the motor housing 47. An outlet opening 91 of the dust conveyance conduit 14 is arranged to communicate in a substantially airtight manner with a corresponding inlet opening (not shown) located in the recess 65 of the dust collection container.

FIG. 8 is an exploded diagram of the dust collection container 13 of the random orbit sander 80 of FIG. 7, showing that it comprises a main body 57, a cap 59, and a filter 61. FIG. 9 includes arrows which represent the flow of dust-laden air through apertures 77 in the working part 7, into the dust conveyance conduit 14 and into the dust collection container 13. The dust is trapped in the dust collection container 13, and the dust-free air flows through the filter 61, out of the dust container 13, through the air flow conduits 83, and is expelled by the first fan 31 through the air outlets 17 into the atmosphere.

Although exemplary embodiments of the present invention have been shown and described, it will be appreciated by those skilled in the art that changes may be made to these embodiments without departing from the principles and spirit of the invention, the scope of which is defined in the appended claims and their equivalents

The invention claimed is:
1. A portable power tool, comprising:
a motor located in a motor housing of the tool and having a rotary output shaft; a working part arranged to be driven by the rotary output shaft; a dust collection container arranged to collect dust produced by the operation of the power tool on a workpiece during use; and a fan arranged to be rotated about an axis by the motor to convey the dust to the dust collection container, the axis of rotation of the fan being non-coaxial with the rotary output shaft of the motor; wherein a part of an exterior surface of the dust collection container is formed as a recess into which the motor housing at least partly extends, such that the dust collection container extends at least partly around the motor housing;
wherein the motor has a longitudinal axis; and
wherein the dust collection container extends along at least a majority of the motor longitudinal axis.

2. A power tool according to claim 1, wherein the recessed part of the dust collection container comprises an exterior wall of the dust collection container.

3. A power tool according to claim 1, wherein at least a portion of the motor housing that extends into the recess also functions as an exterior wall of the dust collection container in use.

4. A power tool according to claim 3, wherein at least a portion of the recessed part of the dust collection container is concave.

5. A power tool according to claim 4, further comprising at least one dust conveyance conduit extending between the dust collection container and a location adjacent to the working part, the dust conveyance conduit arranged to convey dust impelled by the fan from the working part to the dust collection container.

6. A power tool according to claim 5, wherein the dust conveyance conduit extends at least partly around the motor.

7. A power tool according to claim 5, wherein the dust conveyance conduit extends at least partly around the motor housing or is part of the motor housing.

8. A power tool according to claim 5, wherein the dust conveyance conduit includes two or more branches, preferably each branch extending at least partly around the motor.

9. A power tool according to claim 8, wherein the dust conveyance conduit includes two branches which connect with the dust collection container substantially on opposite sides of the motor.

10. A power tool according to claim 9, further comprising a main housing of which the motor housing forms a part, and wherein the dust collection container is arranged to be retained at least partly between first and second spaced apart retaining parts of the main housing.

11. A power tool according to claim 10, wherein the first retaining part houses the fan.

12. A power tool according to claim 11, wherein the first retaining part is located further from the working part than is the second retaining part.

13. A power tool according to claim 10, further comprising a main housing of which the motor housing forms a part, and wherein the dust collection container is arranged to be retained at least partly within a cavity provided by the main housing.

14. A power tool according to claim 10, further comprising a main housing of which the motor housing forms a part, and wherein the dust collection container is removably attached to the main housing.

15. A power tool according to claim 14, further comprising a latch on the main housing or on the dust collection container, to removably attach the dust collection container to the main housing.

16. A power tool according to claim 15, further comprising a surface provided on the dust collection container or on the main housing, with which the latch is arranged to engage such that the dust collection container is urged into a substantially airtight engagement with a dust conveyance conduit of the power tool, the dust conveyance conduit arranged to convey dust impelled by the fan from the working part to the dust collection container.

17. A power tool according to claim 16, further comprising a handle extending from a rear side of the power tool, and wherein the dust collection container is located on an opposite front side of the power tool.

18. A power tool comprising:
a motor located in a motor housing of the tool and having a rotary output shaft; a working part arranged to be driven by the rotary output shaft; a dust collection container arranged to collect dust produced by the operation of the power tool on a workpiece during use; and a fan arranged to be rotated about an axis by the motor to convey the dust to the dust collection container, the axis of rotation of the fan being non-coaxial with the rotary output shaft of the motor; wherein a part of an exterior surface of the dust collection container is formed as a recess into which the motor housing at least partly extends, such that the dust collection container extends at least partly around the motor housing;
further comprising a second fan arranged to be rotated by the motor, wherein the second fan is located adjacent to the working part and is arranged to convey the dust away from the working part towards the dust collection container; wherein the motor has a longitudinal axis; and
wherein the dust collection container extends along as least a majority of the motor longitudinal axis.

19. A power tool according to claim 1, further comprising a third fan arranged to be rotated by the motor, wherein the third fan is arranged to pass air over the motor to cool the motor.

20. A power tool according to claim 1, wherein the power tool comprises a sander, and the working part comprises a platen or a roller arranged to carry sand paper or another abrasive part.

* * * * *